Oct. 14, 1958

W. H. JEROME ET AL 2,855,624

POULTRY HOCK SEVERING APPARATUS

Filed Sept. 13, 1954

INVENTORS
WALLACE H. JEROME
MELVIN J. JENSEN
BY Williamson & Williamson
Schroeder & Adams
ATTORNEYS

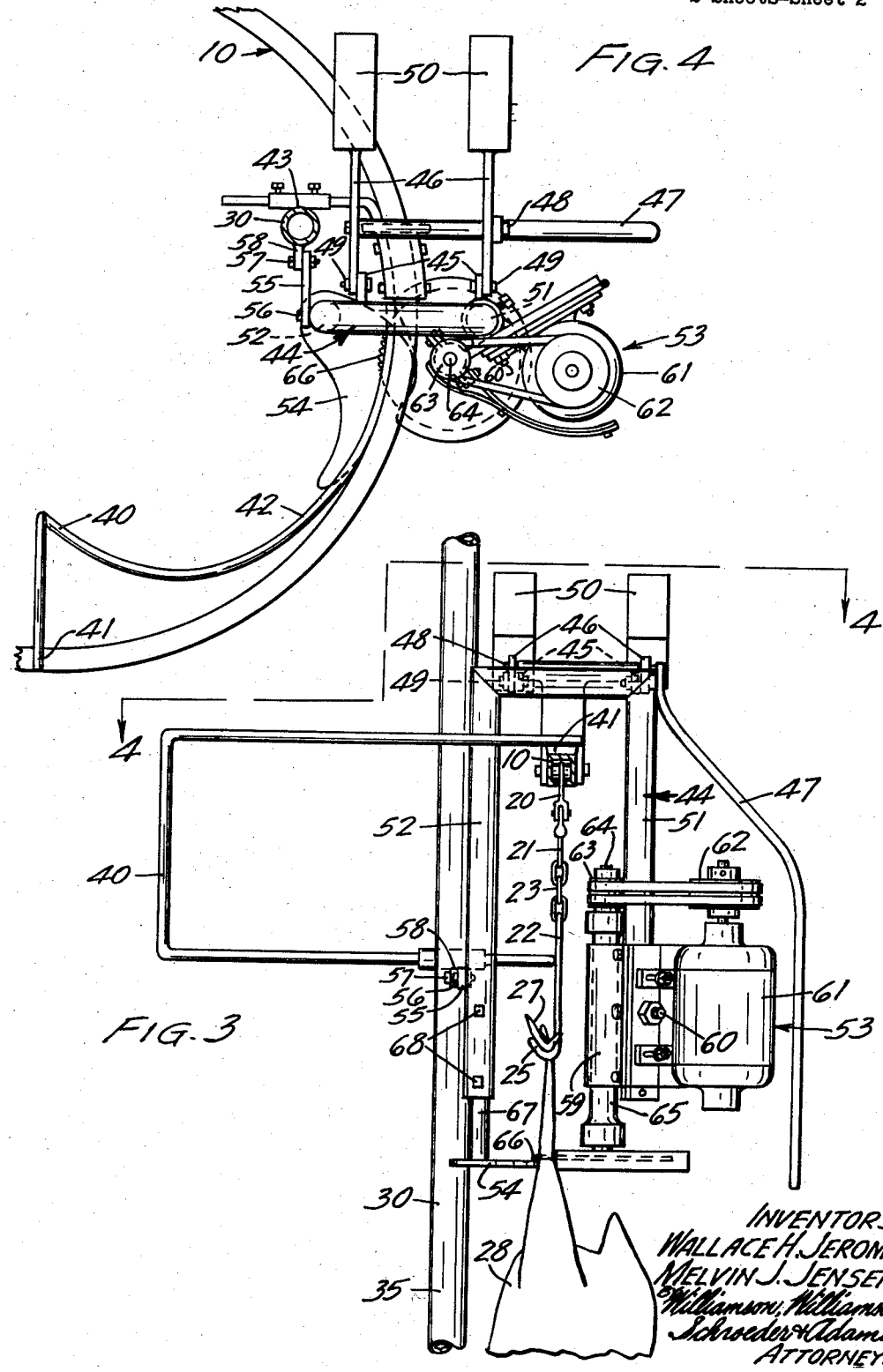

United States Patent Office 2,855,624
Patented Oct. 14, 1958

2,855,624
POULTRY HOCK SEVERING APPARATUS

Wallace H. Jerome and Melvin J. Jensen, Barron, Wis.

Application September 13, 1954, Serial No. 455,413

4 Claims. (Cl. 17—11)

This invention relates to severing legs from poultry and more particularly to a hock saw and method for cutting the feet and lower leg portions from poultry during the dressing thereof.

It is common in present-day practice to sever the legs of poultry at the leg joints when they are dressed, particularly if it is intended that the poultry be packaged or canned thereafter. In the dressing operation it is customary to first pick the feathers from the birds and then to move them along a conveyor to a point where an operator removes the entire bird, transports it to a chopping machine and then places the legs of the bird in position beneath the chopping blade and subsequently actuates the device so as to remove the lower legs and feet from the bird. The remaining carcass is then put back on a second conveyor system where evisceration of the bird is accomplished. In removing the individual birds from the first conveyor, it is necessary for the operator to unfasten the feet and to lift down the bird preparatory to transporting it to the chopping machine. During the chopping operation, the legs are often misaligned so that one is cut shorter than the other and it is difficult for the operator to quickly chop exactly across the middle of the leg joints because he must hold the bird in position both during aligning and when actuating the device. The chopping equipment often crushes the bones and causes them to sliver so that sharp particles become lodged in the meat to the annoyance of the purchaser. Furthermore, any jagged or sharp points produced by the chopping operation may cause packages, such as the transparent plastic film used to wrap the birds, to puncture or tear.

It is an important object of the invention to provide a novel apparatus and method for the economical and efficient separation of waste leg portions of poultry during the dressing operation.

It is another object of the invention to provide a sanitary and safe hock sawing apparatus in which the lower legs and feet are severed from the remainder of each bird while traveling on a conveyor relatively to a severing mechanism and without necessitating removal of the bird from the conveyor.

It is a further object of the invention to provide a simple and unique method of properly severing the legs of partially dressed fowl while each bird remains on the standard conveyor mechanism employed in such operations.

It is another object of the invention to provide a portable severing apparatus which can be simply and quickly mounted in fixed relation with respect to a standard conveyor device, said apparatus being adapted to intersect birds as they are moved along the conveyor to cut precisely through the leg joints without chipping or crushing the bones.

It is a still further object to provide a device of the class described in which severing mechanism can be raised and lowered by manual control to properly sever and release birds from their legs and feet at the middle joint, and dispensing with the necessity for manually unhooking the birds from the conveyor.

These and other objects and advantages of the invention will more fully appear from the following description made in connection with the accompanying drawings, wherein like reference characters refer to the same or similar parts throughout the several views, and in which:

Fig. 3 is a side elevation taken from the right in Fig. 2 and showing an enlarged detail of the severing and control means; and Fig. 4 is a top view of the severing device taken on the line 4—4 of Fig. 3.

Figure 1:
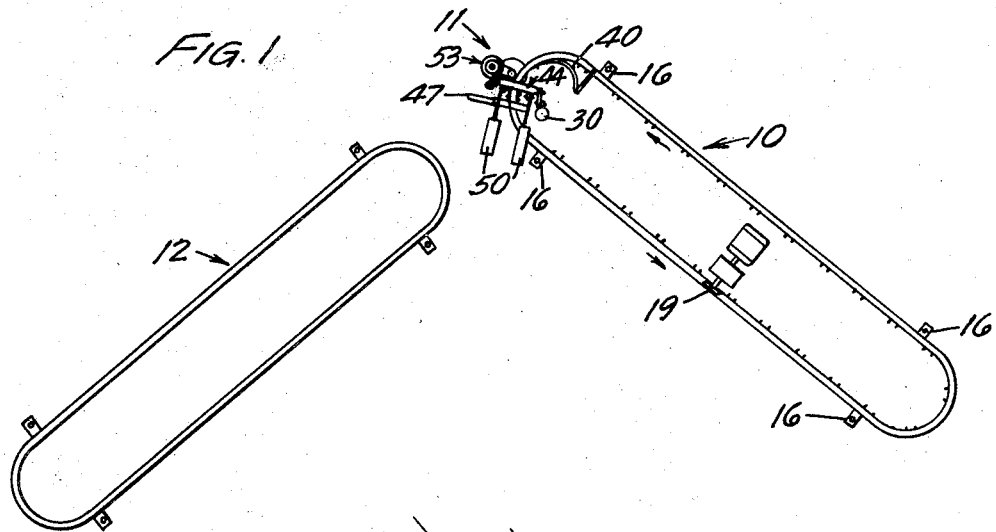
Fig. 1 is a diagrammatic view of a typical layout in a dual conveyor system for dressing poultry, the position of our apparatus being illustrated relative to the conveyor layout.

Referring now more particularly to the drawings, Fig. 1 shows a typical layout in a poultry dressing establishment with reference to the conveying apparatus which forms a part of the invention herein disclosed. The conveyor system usually comprises a first conveyor indicated generally at 10 which is mounted adjacent the ceiling of a room and in horizontal relation for conveying birds in endless fashion around the conveyor. The birds may have their feathers picked during travel on the conveyor 10 and an operator usually stationed at a position following the mounting position of the fowl on a conveyor. Details of the mounting of the individual brids will be described in more detail in connection with the adaptation of the conveying mechanism to our invention. Our hock severing apparatus is indicated generally at 11 and is preferably made portable so that it can be installed at any position in the entire periphery of the conveyor system. We prefer, however, to mount the severing apparatus at a curved portion of the conveyor as shown in Fig. 1. A second conveyor system 12 is required for the evisceration operation which forms no part of the present invention except insofar as the rapid and accurate delivering of the fowl will prepare it for further processing on the second conveyor, which may be located conveniently adjacent our apparatus on the first conveyor.

Figure 2:
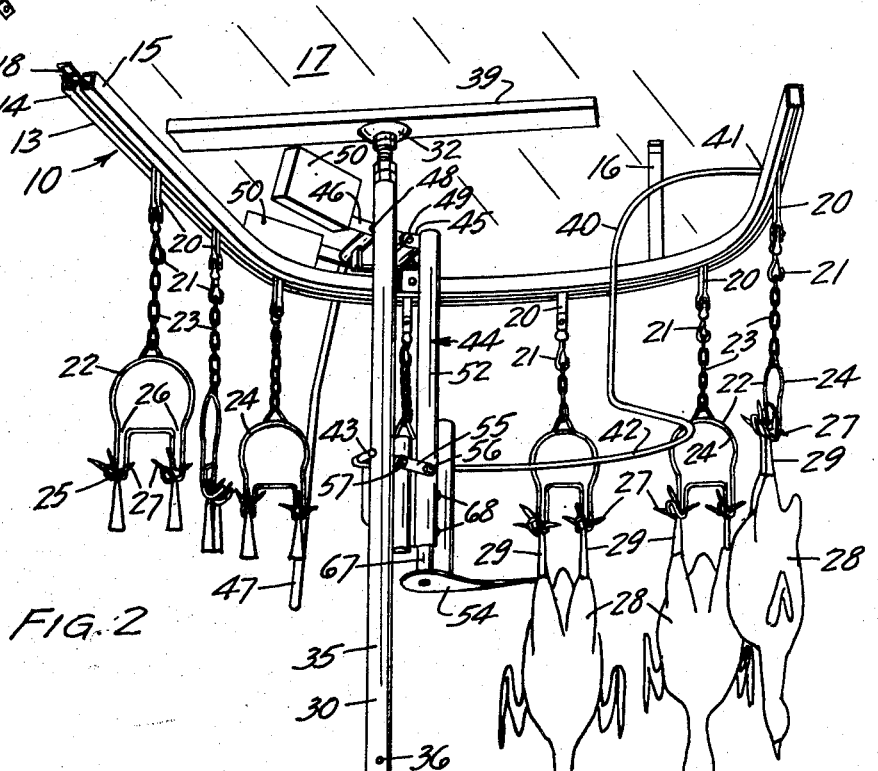
Fig. 2 is a perspective view of the end portion of an endless conveyor system utilizing our apparatus in conjunction therewith for severing the legs of poultry.

Referring now to Fig. 2, the conveyor 10 constitutes an elongated closed track 13 which may comprise a pair of opposed channel members 14, 15, the channel members being mounted by means of ceiling brackets 16 to the ceiling 17 and maintaining the open sides thereof in opposed relation to establish a trackway of endless nature. An elongated traveler member 18 may be disposed within the track 13 for travel thereabout under motivation by the motor-driven element 19 as shown in Fig. 1. The traveler member may comprise a link belt, flexible roller support members or other conventional conveyor belting, all as is well-known in the art.

Disposed in spaced relation and depending from the elongated traveler member 18 are a plurality of hangers 20, each being provided with a snap hook 21 as shown. A shackle member 22 having an interconnecting chain 23 depends therefrom in free suspension and preferably comprises an endless bent rod 24 with double hook members 25 in spaced relation on each shackle, the hooks 25 having opening passageways 26 for inserting the feet 27 of a bird 28, the legs 29 being spaced apart and on the same horizontal plane. Shackles 22 are permitted to turn in free suspension except as limited by the guiding mechanism to be later described in connection with our severing mechanism. It will be noted that the shackles 22 are generally of identical construction and are positioned the same vertical distance from trackway 13 all throughout the endless length of the conveyor. When birds of different sizes are secured to the shackles, the various portions of the birds' body are not necessarily in horizontal alignment with those of the neighboring bird. As a matter of fact, misalignment of the corresponding parts is generally the rule. For purposes of picking feathers, such differences in the positioning of the birds is inconsequential.

Our hock severing mechanism is preferably portable in nature as is shown in Fig. 2 and may be mounted at any position along the length of the conveyor 10. We prefer the simple adjustable standard 30 for supporting the severing mechanism and this standard may be interposed between the ceiling 17 and the floor 31 as shown. The standard may have a bearing plate 32 at the upper end thereof and a second bearing plate 33 at the lower end with an extendible sleeve 34 interlockable with the main portion 35 by means of pin 36 which can be positioned through openings 37 aligned across the main tubular member 30 and the sleeve 34. A screw adjustment 38 may be employed in conjunction with plate 33 so as to firmly brace the standard 30 in vertical position with respect to the conveyor 10. It is understood that other members such as bearing block 39 may be employed to gain rigid contact with ceiling 17. The standard 30, ceiling 17 and hangers 16 may be considered in their entirety as mounting structure for the conveyor and the severing mechanism.

Also secured in rigid relationship between the conveyor and the standard 30 is a guide rod 40 which is fastened as by welding at 41 to an upper portion of conveyor 10 and is bent in a wide curve 42 adjacent the projected pathway of shackles 22 and is rigidly secured at its other end 43 to the main standard body 30 as shown in Fig. 2. The function of the guide bar 40 is to turn and maintain the shackles in prescribed position preparatory to passing through the severing mechanism.

A U-shaped frame 44 is pivotally mounted at its upper closed end via a pair of bracket members 45 to a pair of links 46, the latter being rigidly secured in spaced relation to a depending handle 47 and jointly pivoted at 48 in rigid relation with the standard 30. The links 46 are pivoted outwardly at 49 to the bracket members 45 so as to cause vertical reciprocation of the U-shaped frame 44 whenever the handle 47 is arcuately moved. One or more weight members 50 is secured in counterbalancing relationship with the links 46 and at the opposite side of pivot 48 from the interconnection with frame 44.

The frame 44 has two depending legs 51 and 52 as shown in Fig. 3 and the leg 51 is adapted to hold the severing mechanism 53 while the leg 52 is adapted to support a guide plate 54 as will be presently described. A second pivotal link 55 is secured through pivot pin 56 to the lower portion of leg 52 and is also pivotally secured at 57 to a bracket 58 rigidly formed on the standard 30. The frame 44 is substantially vertical and the pivotal arrangement maintains the vertical disposition of the severing mechanism 53 when the handle 47 is arcuately moved to the left or right as shown in Fig. 2.

The severing mechanism 53 comprises a journal and motor mount 59 which is clamped to the lower end of leg 51 by such means as the nut and bolt 60. The journal and motor mount holds motor 61 in vertical position and with the drive pulley 62 in alignment with the driven pulley 63 on the shaft 64. Shaft 64 in turn extends vertically down through sleeve bearing 65 and has secured at the lower extension thereof a circular saw 66 which is horizontally disposed.

The guide plate 54 is mounted through a rigid upstanding connection 67 to the lower end of arm 52 by such means as bolts 68. The plate 54 is rigidly spaced with respect to the circular saw 66 and preferably underlies the outer blade circumference by a fraction of an inch and therefore provides a guide for introducing and holding the leg portions of each bird as it is brought into contact with the saw blade 66.

In the use and operation of our poultry hock severing apparatus, the birds are placed on the shackles 22 with their feet firmly held in the hook portions 25 in spaced relation, the mounting of the birds being accomplished at a position on the conveyor 10 remote from the severing mechanism. The conveyor travels in a general clockwise direction as viewed in Fig. 2, the birds proceeding from right to left past the severing mechanism. As the shackles 22 near the curved end of the conveyor system, they first come in contact with the guide rod 40 at its curved portion 42. The shackles are then caused to orient themselves so as to pass through the severing mechanism with the bird disposed laterally thereto and with the legs in spaced alignment in the direction of travel.

The severing device 11 is shown positioned with the standard 30 just inside the conveyor track 13 with the handle 47 disposed over the top and outwardly. The severing mechanism 53 is oriented so that the guide plate 54 together with the horizontal saw blade 66 will present a converging entranceway in the projected path of legs 29 of the bird 28. The saw blade is set in motion by energizing the motor 61 through conventional means (not shown) and the blade travels in a counterclockwise direction as viewed in Fig. 4. Each of the shackles 22 has a predetermined guided relation by virtue of the guide rod 42 but the size of the bird 28 will cause the joints of the legs to assume different positions from bird to bird in respect to their horizontal planes. The operator therefore observes each approaching bird with reference to the location of the leg joints and moves the handle 47 from left to right or in reverse order as the case requires. The counterbalances 50 substantially equal the weight of the frame motor and saw and hence requires very little effort to accomplish the vertical adjustment. The saw blade 66 is therefore aligned so as to precisely cut through the leg joints of bird 28 as it approaches the mechanism. The operator holds the device until both legs are severed and the bird 28 then drops downwardly to be collected by means (not shown) and placed on the second conveyor 12 for evisceration. As soon as the second leg of the bird 28 is severed, the operator immediately observes the location of the leg joints in the next approaching bird and moves the lever 47 to the right as viewed in Fig. 2 if it is necessary to raise the saw blade 66, or moves the lever to the left for lowering the saw blade. The severed legs continue in their hooked relation with shackles 22 and may be removed either manually or by mechanical means as they approach the loading position. Where the legs are removed manually, the same operator who positions the birds on the shackles may alternately remove the severed legs from the approaching shackles.

Since the entire mechanism is portable, it may be positioned anywhere along the conveyor track and if the needs or requirements of the poultry dressing factory change from time to time, the device can be positioned in an infinite number of places. The versatility of a conventional poultry dressing system can thus be immeasurably improved and the equipment and space formerly required for the regular chopping mechanism can be utilized for other purposes. We have found that unskilled operators can quickly accomplish a professional job in which the leg joints are precisely severed without splintering the bones and with a minimum of effort. The operator can either stand or sit during the severing of the birds and the device is extremely safe since there is no necessity for the operator to touch the birds or even approach the cutting edge of the saw element.

It will, of course, be understood that various changes may be made in the form, details, arrangement and proportions of the various parts without departing from the scope of our invention.

What we claim is:

1. Poultry hock severing apparatus comprising, a support means, a frame structure mounted for vertical movement on said support means, severing mechanism mounted on said frame and having a horizontally directed cutting element disposed thereon, guide means mounted on said frame structure in horizontally opposed relation with respect to said cutting element for guiding a bird therethrough, and a plurality of spaced shackle members supported on the support means for horizontal travel above the cutting element and guide means, and each adapted to hold a bird by its feet in freely suspended condition, whereby a bird in its guided travel will have its legs severed from the body at the hock portions.

2. The apparatus set forth in claim 1, wherein the cutting element is a circular saw.

3. The apparatus set forth in claim 1, and a guide bar mounted on said support means adjacent the projected pathway of the shackle members for orienting the shackles and birds respectively suspended therefrom prior to passing through the cutting element and guide means.

4. The apparatus set forth in claim 1, wherein a manually operable handle is connected with said frame for lowering and raising the same, and counter-balancing mechanism for the frame is shiftably mounted on the support means.

References Cited in the file of this patent
UNITED STATES PATENTS

| | | |
|---|---|---|
| 1,890,394 | Long | Dec. 6, 1932 |
| 2,236,075 | Siemann | Mar. 25, 1941 |
| 2,237,203 | Swanson | Apr. 1, 1941 |
| 2,310,881 | Swanson | Feb. 9, 1943 |
| 2,381,044 | Franz | Aug. 7, 1945 |
| 2,632,200 | Fortner et al. | Mar. 24, 1953 |